United States Patent
Arnold et al.

(10) Patent No.: US 6,260,657 B1
(45) Date of Patent: Jul. 17, 2001

(54) SEISMIC PULSE GENERATOR

(75) Inventors: Gareth Christopher Arnold, Copt Oak; Stephen Joseph Callan, Loughborough, both of (GB)

(73) Assignee: BG PLC, Reading (GB)

( * ) Notice: Subject to any disclaimer, the term of this patent is extended or adjusted under 35 U.S.C. 154(b) by 0 days.

(21) Appl. No.: 08/849,889

(22) PCT Filed: Dec. 21, 1995

(86) PCT No.: PCT/GB95/03005

§ 371 Date: Sep. 17, 1997

§ 102(e) Date: Sep. 17, 1997

(87) PCT Pub. No.: WO96/20414

PCT Pub. Date: Jul. 4, 1997

(30) Foreign Application Priority Data

Dec. 23, 1994 (GB) .................................................. 9426193

(51) Int. Cl.[7] ....................................................... G01V 1/06
(52) U.S. Cl. ............................ 181/116; 181/117; 181/118
(58) Field of Search ............................ 181/116–120, 113; 367/144

(56) References Cited

U.S. PATENT DOCUMENTS

| 4,713,800 | * | 12/1987 | Russell | 367/144 |
| 4,928,785 | | 5/1990 | Harrison . | |
| 5,646,909 | * | 7/1997 | Bouyoucos | 367/144 |
| 5,646,910 | * | 7/1997 | Bouyoucos | 367/144 |

FOREIGN PATENT DOCUMENTS

| 0 380 022 | | 8/1990 | (EP) . |
| 2235376 | * | 1/1975 | (FR) . |
| 2140560 | | 11/1984 | (GB) . |

* cited by examiner

*Primary Examiner*—Khanh Dang
(74) *Attorney, Agent, or Firm*—Larson & Taylor, PLC

(57) ABSTRACT

A seismic pulse generator (1) has a chamber (4) pressurised with gas. The generator includes a solenoid valve (60) which can be actuated to cause the release to atmosphere of only a small amount of pressurised gas from a small control chamber (34) behind a main piston (30) to enable the piston to move away from a valve seat (32) around an outlet (26). This permits the abrupt release of the pressurised gas in the chamber (4) through the outlet and the "firing" of the generator. The arrangement maximises the use of the main pressurised gas for actual "firing" of the generator.

23 Claims, 3 Drawing Sheets

SEISMIC PULSE GENERATOR

BACKGROUND OF THE INVENTION

1. Field of the Invention

The present invention relates to seismic pulse generation and, more particularly, to seismic pulse generators for use, for example, in both on-shore and off-shore exploration.

2. Description of the Related Art

One kind of seismic pulse generator with which the invention is concerned, although not exclusively, is that which basically includes a two-chamber device in which a "driver" gas at relatively high pressure in one chamber is employed to generate a shock wave in the other, adjoining, chamber which contains a different gas which is at relatively low pressure. The chambers are not allowed to communicate with each other until the generator is operated. Communication between the two chambers may be prevented for example by means of a releasable shuttle valve member which in the closed position closes an opening between the chambers. When the shuttle valve member is abruptly released from this closed position, to allow communication, a shock wave is generated and propagates in the low pressure chamber as a result of the impact of the high pressure gas onto the low pressure gas. This kind of generator is also referred to as a seismic shock gun. In prior art devices the release of the shuttle valve member from the closed position mentioned above may be initiated by releasing a pressure release member to allow the release of a small portion of the high pressure gas rearwardly from the generator. The pressure release member may be, for example, a poppet-valve or a flap valve as described in Applicant's earlier GB patent specifications nos. 2165945B and 2230860B, respectively.

An object of the invention is to provide a construction of seismic pulse generator which facilitates repeatable firing.

BRIEF SUMMARY OF THE INVENTION

The present invention consists in a seismic pulse generator comprising a body having an internal gas-pressurisable charging chamber, an outlet, and a gas-operated piston valve which is slidably movable within an associated guide to a position to close the outlet when the charging chamber is pressurised with gas to attain a primed ready to fire state for the generator, the piston moving away from the closed position to permit an abrupt release of pressurised gas from the charging chamber through the outlet upon firing of the generator by release of a small portion of gas from a gas pressurised control chamber to atmosphere by means of a solenoid valve assembly mounted on the body, the solenoid valve assembly comprising an annular plunger valve slidably mounted on a valve stem so as to be movable within an annular channel defined between the valve stem and an annular wall, the valve stem having a generally longitudinal gas exhaust passage extending therethrough and terminating at a first opening at the end of the stem remote from the piston, via which first opening the passage communicates with atmosphere, and at least one second lateral opening in the side or peripheral wall of the stem for communicating with the interior of the control chamber, wherein the valve plunger is normally biased to a position on the valve stem whereat the valve plunger closes off the at least one second opening and wherein on actuation of the solenoid valve the plunger slides on the valve stem away from the closed position to allow the at least one second opening to be in communication with the control chamber, whereby the release of the small portion of the pressurised gas from the control chamber to atmosphere can occur.

Conveniently, the passage, via the first opening, opens into a buffer chamber of relatively large volume and having an outlet which vents to atmosphere. This buffer chamber would act to disperse or buffer the effect of the sudden or violent release of the small portion of pressurised gas via the valve stem passage. The advantage of this is that there is a reduction in the pressure and the noise level of the suddenly or violently released gas.

The buffer chamber may in part be defined by a plug or the like fitting in the body of the generator. Conveniently, the plug is adapted to be a removable f it on the body. For example, the plug may be a screw threaded fit in the body. In one embodiment the solenoid valve assembly may be removably secured to the plug, such that when the plug is a removable fit on the body the solenoid assembly can be removed from the body with the plug.

Conveniently, the longitudinal part of the passage in the valve stem and the buffer chamber are substantially in alignment. Such alignment reduces the restriction to, or drag on, the flow of the small portion of gas exhausted from the control chamber to the outlet and thus facilitates the rapid release of the gas from body.

The buffer chamber may serve as a conduit for a portion of an electrical power supply line for the solenoid valve and/or for a portion of a pressuring gas inlet line for the pressurisable control chamber.

Advantageously, a silencer is mounted on the body so that gas released from the pressurisable control chamber via the passage passes through the silencer to atmosphere. The silencer may be of known or traditional design. The provision of the silencer reduces the likelihood of the sound of the firing generator disturbing operators or other people nearby. Preferably, the silencer is in general alignment with the longitudinal part of the passage in the valve stem, and the buffer chamber if present, to further facilitate rapid release of gas from the control chamber.

The solenoid valve assembly may include a gas inlet for communicating with the annular channel with the valve plunger at least in part defining passages which communicate with the control chamber. In one embodiment the annular valve plunger may comprise in its outer peripheral surface channels or grooves which extend generally longitudinally of the plunger and define with the annular wall the passages providing communication between the gas inlet and the control chamber. In an alternative arrangement the valve plunger may have through holes for providing communication between the gas inlet and the control chamber.

The piston guide may be in the form of a cylinder located in the pressurisable chamber and aligned with the outlet associated with the piston valve. An end of the cylinder remote from the outlet may accommodate at least part of the solenoid valve assembly. The control chamber is defined by the cylinder and the opposing solenoid valve assembly and the piston valve when the latter is in its closed position closing off the outlet. The control chamber may communicate with the charging chamber via a bleed hole or resistance-to-flow through hole for example in the wall of the cylinder. Consequently, the supply of pressurised gas to the control chamber can be used to pressurise the charging chamber by virtue of the bleed hole.

In the case where the plug defining a buffer chamber is provided, the cylinder may be secured to the plug. Thus, if the plug is removable from the body, the cylinder as well as the solenoid valve assembly may be removed with the plug when the latter is removed from the body. This facilitates access to the interior of the body and to the solenoid valve assembly, piston valve and cylinder.

The solenoid valve assembly may comprise one or more body parts defining at least one passage which provides communication with the annular channel and with the passage in the valve stem when the solenoid valve is actuated and the at least one lateral opening in the valve stem is uncovered as the valve plunger moves from its closed position.

In one embodiment of the generator, the pressurisable charging chamber adjoins a second chamber with the outlet which is closable by the piston valve opening into the second chamber such that when the generator is "fired" the piston valve moves away from the closed position to uncover the outlet to cause communication between the adjoining chambers and generation of a shock wave in the second chamber in response to the abrupt release of gas from the pressurised charging chamber, the second chamber having means to permit a pulse of energy to be transmitted from the second chamber in response to the shock wave generated in the second chamber.

The means to permit a pulse of energy to be transmitted may comprise outlet means to permit the release of gas pressure and a shock wave from the second chamber. The outlet means may be a permanently open outlet from the second chamber, or may comprise a valve which is operable to open from a closed position whereat it closes an outlet from the second chamber. The outlet valve means may form part of a fitting adapted to be a releasable fit on the second chamber.

The present invention also consists in a seismic pulse generator comprising a body having an internal gas pressurisable charging chamber adjoining a second chamber with an outlet means, a gas operated piston which when the charging chamber is pressurised is movable away from a position whereat it closes an opening to cause communication between the chambers, abrupt release of gas from the pressurised charging chamber through the opening, and generation of a shock wave in the second chamber, the gas operated piston being slidably movable within an associated cylinder located in the first chamber, a gas pressurisable control chamber being defined by the end of the piston remote from the opening when the piston is in the opening closed position, a section of the cylinder and a solenoid valve assembly mounted on the body at or adjacent the end of the cylinder remote from the opening, wherein when the control chamber is pressurised and the valve assembly is in a non-actuated state or condition a gas exhaust passage for connecting the control chamber to atmosphere is closed, and wherein on actuation the solenoid valve assembly operates to effect communication between the control chamber and atmosphere via the gas exhaust passage to allow the release of gas from the control chamber to atmosphere and the piston to move away from the opening-closed position and permit the abrupt release of gas from the pressurised charging chamber.

The present invention further consists in a seismic pulse generator comprising a body having an internal gas-pressurisable charging chamber, an outlet, and a gas-operated piston valve which is slidably movable within an associated guide to a position to close the outlet when the charging chamber is pressurised with gas to attain a primed ready to fire state for the generator, the piston moving away from the closed position to permit an abrupt release of pressurised gas from the charging chamber through the outlet upon release of a small portion of gas from a gas pressurised control chamber to atmosphere, wherein the small portion of released gas passes through a buffer chamber associated with the generator before passing to atmosphere.

The present invention still further consists in a seismic pulse generator comprising a body having an internal gas-pressurisable charging chamber, an outlet, and a gas-operated piston valve which is slidably movable within an associated guide to a position to close the outlet when the charging chamber is pressurised with gas to attain a primed ready to fire state for the generator, the piston moving away from the closed position to permit an abrupt release of pressurised gas from the charging chamber through the outlet upon release of a small portion of gas from a gas pressurised control chamber to atmosphere, wherein the small portion of released gas passes through a silencer connected to the generator.

BRIEF DESCRIPTION OF THE DRAWINGS

In order that the invention may be more readily understood, reference will now be made, by way of example only, to the accompanying drawings, in which.

DETAILED DESCRIPTION OF THE INVENTIONS

Figure 1:
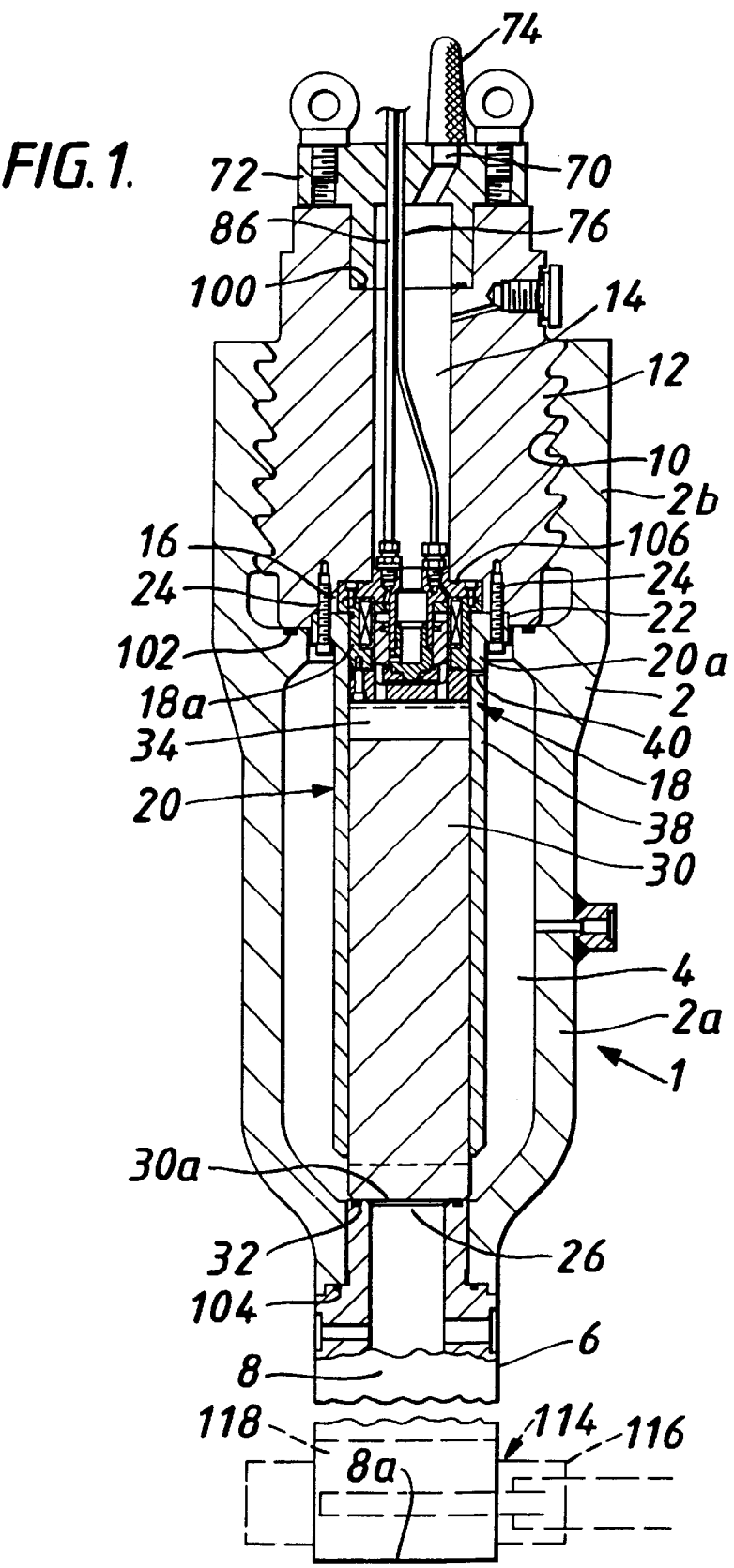
FIG. 1 is a longitudinal sectional view of one embodiment of seismic pulse generator according to the invention.

With reference to the drawings, a seismic pulse generator 1 of the 'shock gun' kind comprises a first body part 2, the lower portion 2a of which provides a first charging chamber 4 for relatively high pressure gas and adjoins a second generally tubular body part 6 which defines a second chamber 8 for relatively low pressure gas.

As viewed in FIG. 1, the upper portion 2b of the first body part 2 is above the charging chamber 4 and defines an internally threaded opening 10 into which is screwed an externally threaded plug 12 having an axial buffer passage or chamber 14 extending therethrough. The lower end 16 of the plug 12 is recessed and shaped to accommodate the upper end part 18a of a solenoid valve assembly 18. The lower part 18b of the valve assembly 18 is accommodated in the upper end portion 20a of a piston valve guide 20 which is in the form of a cylinder and which extends downwardly towards the second chamber 8.

The upper end of the cylinder 20 has an outwardly extending flange 22 via which the cylinder is secured as at 24 to the plug 12. Opposing portions of the secured together plug 12 and cylinder 20 sandwich the solenoid valve assembly 18 and locate it in position therebetween. The lower end of the piston valve cylinder 20 terminates short of an outlet 26 from the charging chamber 4, the outlet 26 also serving as an opening to provide communication between the two chambers 4 and 8. A piston valve 30 is slidable in the cylinder 20. The piston valve may be of substantially cylindrical form and made of a suitable material, for example plastics or steel. The lower end face 30a of the piston valve is engagable with a sealing ring 32, which surrounds the outlet 26, to close the outlet. The dimension of the lower end face 30a is such that when it engages the sealing ring 32 the outer periphery of the face 30a is beyond the sealing ring 32 and an outer peripheral portion of the face 30a is exposed to gas in the charging chamber 4. As may be seen from FIG. 1, when the piston valve 30 is in engagement with the sealing ring and closes the outlet a chamber 34, referred to as the control chamber, is defined by the cylinder 20 between the lower end of the solenoid valve assembly 18 and the top of the piston valve 30.

Figure 2:
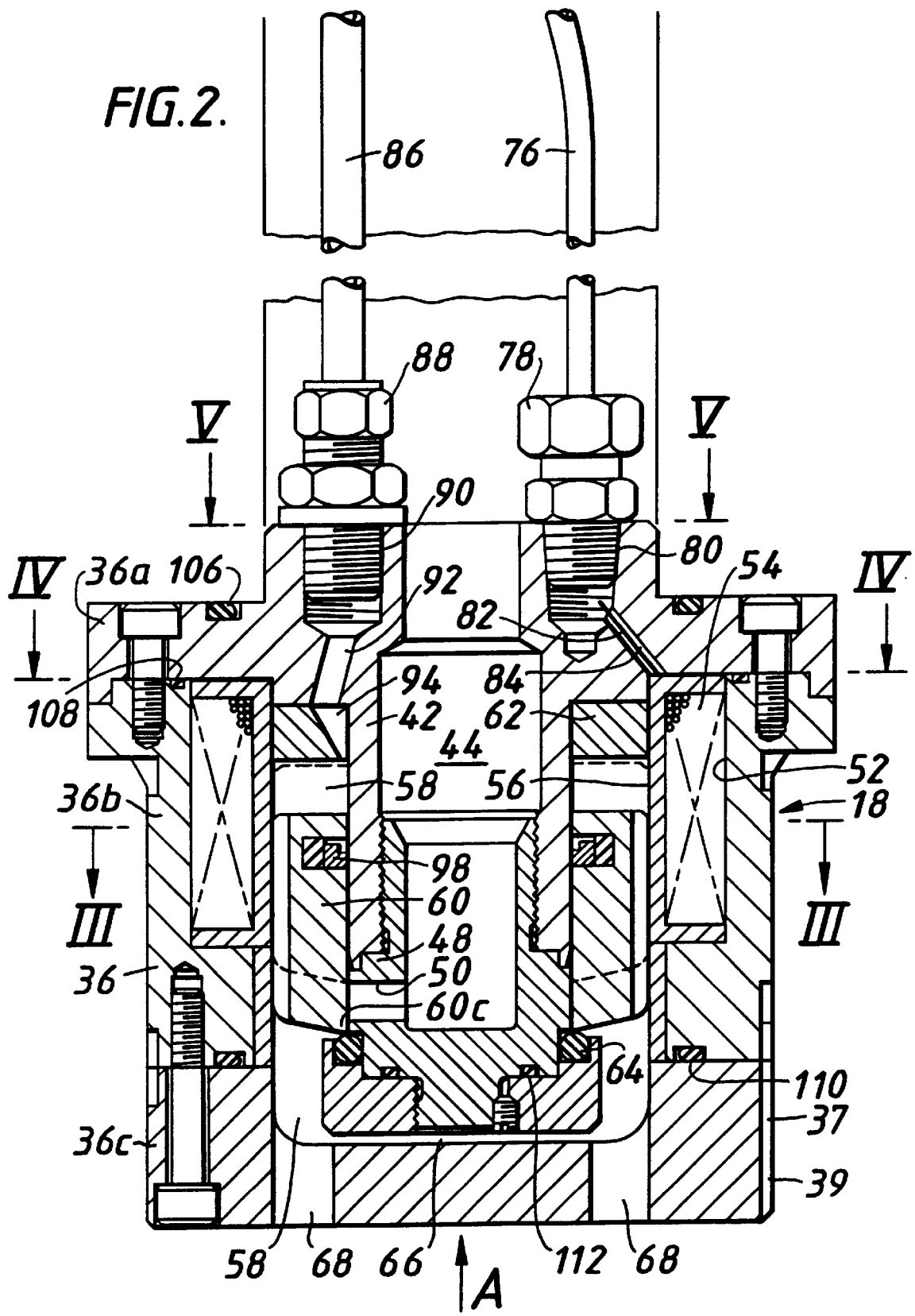
FIG. 2 is an enlarged sectional view of the solenoid valve assembly part of the generator of FIG. 1.
Figure 3:
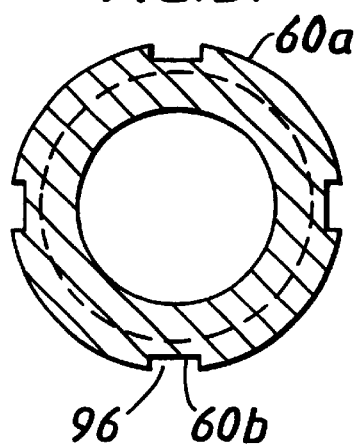
FIG. 3 is a cross-sectional view of the solenoid valve assembly taken on the line III—III in FIG. 2.
Figure 4:
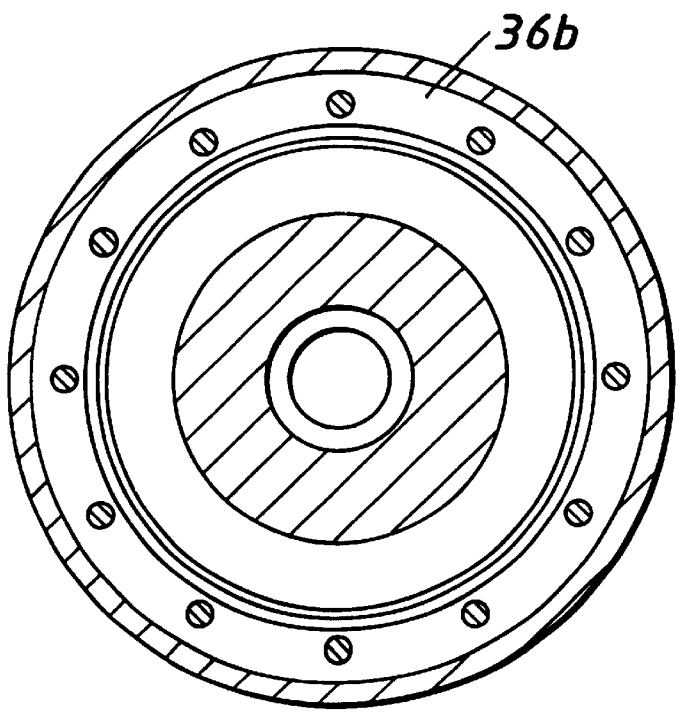
FIG. 4 is a cross-section view of the solenoid valve assembly taken on the line VI—VI in FIG. 2.
Figure 5:
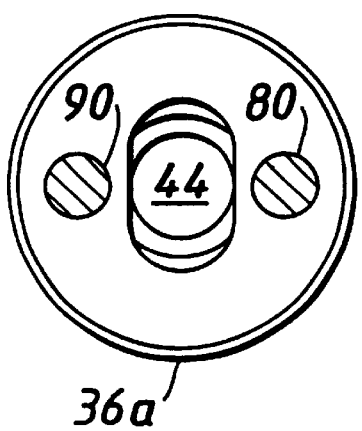
FIG. 5 is a cross-sectional view of the solenoid valve assembly taken on the line V—V in FIG. 2.
Figure 6:
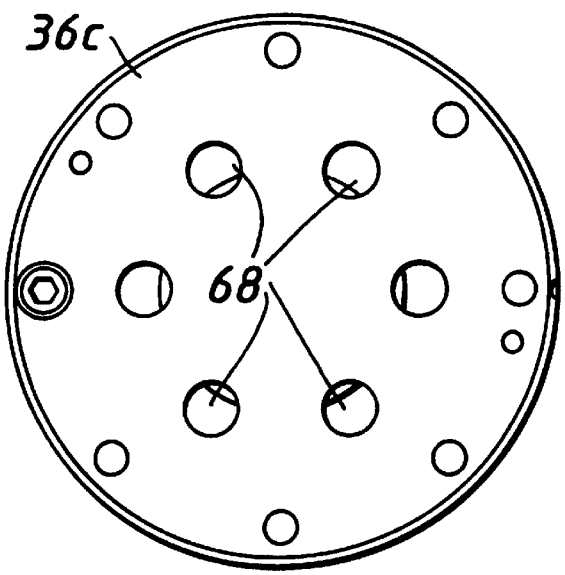
FIG. 6 is an end view of the solenoid valve assembly in the direction of arrow A.

The solenoid valve assembly 18 which is shown on an enlarged scale in FIG. 2 comprises a generally annular housing 36 having upper, intermediate and lower parts 36a, 36b and 36c secured together.

A recess or channel 37 extends from the bottom of the housing 36 part way up the outer periphery thereof and together with the wall 38 of the cylinder 20 defines a passage 39 which communicates with a resistance-to-flow through hole 40 in the wall 38. The resistance-to-flow through hole 40 and the passage 39 provide communication between the control chamber 34 and the annular charging chamber 4 surrounding the piston valve 30 and cylinder 20 and substantially defined between the wall of the lower portion 2a of the first body part 2 and the cylinder 20.

Extending centrally downwardly from the upper part 36a into the interior of the housing 36 is a valve stem 42 having an axial passage 44 therein which is aligned with and communicates with the chamber 14 in the plug 12 via a first opening 46 at the top of the valve stem. The bottom end of the valve stem 42 is closed. Adjacent the bottom end of the passage 44 the peripheral wall of the lower part 48 of the valve stem is provided with a plurality of lateral openings or through-holes 50 which communicate with the passage 44.

The interior surface of the annular intermediate housing part 40b is recessed as at 52. The recess 52 locates a solenoid coil or winding assembly 54. The inner periphery 56 of the assembly 54 provides an annular wall which, together with the valve stem 42, defines an annular channel 58 therebetween. An annular plunger valve 60, made for example of soft iron, is slidably mounted on the valve stem 42 so as to be movable within the channel 58.

An impact washer 62 for the plunger valve 60 is located at the upper end of the annular channel 58.

A sealing ring 64 for engagement by the plunger valve 60 is located around the valve stem 42 at a location a little below the through-holes 50, as viewed in FIG. 2.

The bottom of the valve stem 42 terminates short of the lower part 40c of the housing so that there is a gap 66 therebetween which communicates with the annular channel 58.

The bottom of the lower part 36c of the housing 36 has a plurality of downwardly extending holes 68 which provide communication between the annular channel 58 (and the gap 66) and the control chamber 34 between the solenoid valve assembly 18 and the top of the piston valve 30.

The longitudinally extending chamber 14 in the plug 12, which communicates with the axial passage 44 in the valve stem 42, vents to atmosphere via an outlet 70 in an end cap or flange 72 secured to the top of the plug 12.

A silencer 74 is fitted on the outlet 70 at the end cap.

An electrical power supply line 76, for supplying electricity to the solenoid winding 54 into order to actuate the solenoid valve (as will be described below), extends through the end cap 72 in a sealed manner and then through the chamber 14 in the plug to a power connector 78 fitted in an aperture 80 in the top of the upper housing part 36a. The connector 78 is connected to the winding 54 via wiring 82 which extends through a passage 84 in the upper housing part.

Pressurised gas, e.g. helium, for the charging chamber 4 is supplied from a source (not shown) via a gas inlet line 86 which also extends through the end cap 72 in a sealed manner and then through the chamber 14 in the plug 12 to a connection piece 88 fitted in an aperture 90 in the top of the upper housing part 36a. A passage 92 in the upper housing part extends from the connection piece 88 to an opening 94 in the impact washer 62 to provide communication to the portion of the annular channel 58 above the annular valve plunger 60. The valve plunger comprises in its outer peripheral surface 60a a plurality of spaced channels 60b which extend longitudinally of the plunger valve and define with the surrounding annular wall 56 passages 96 which allow communication between the gas inlet line 86 and the control chamber 34 and the charging chamber 4, since the annular channel 58 communicates with the control chamber 34 via the holes 68, and the control chamber 34 communicates with the charging chamber 4 via the passage 39 and the through-hole 40.

It will be appreciated that the generator should be substantially gas- or air-tight to prevent undesired leakage of gas or air when the generator is pressurised for use. Consequently, the valve plunger 60 carries an annular or shaft seal 98 to provide a sliding seal between the plunger 60 and the valve stem 42, and O-ring seals are also provided between various connected parts of the generator as at 100, 102, 104, 106, 108, 110 and 112.

The embodiment of shock gun presently being described is arranged, as will be readily appreciated by a person skilled in the art, such that when the valve plunger 60 is in its usual (non-actuated) position (as shown in full lines in FIG. 2) it is biased or urged by the pressure of the gas from the gas inlet line to the position on the valve stem 42 whereat the lower edge 60c of the valve plunger engages the sealing ring 64 and closes off the lateral openings 50 and thereby prevents communication between the chamber 34 and atmosphere. On actuation or energisation of the solenoid valve the plunger 60 is caused to slide up the valve stem 42 to a position (as shown in broken lines in FIG. 2) so that the openings 50 are uncovered and the chamber 34 is vented to atmosphere.

A method of operating the above seismic pulse generator will now be described.

Conveniently, the generator 1 is used in a generally upright position, as viewed in FIGS. 1 and 2. The generator may be located in position for use off-shore with the lower end of the second chamber 8 beneath the surface of the water. In the present embodiment the lower end of the second chamber has a permanently open outlet 8a which is submerged in the water.

With the solenoid valve in the non-energised state and thus the annular plunger 60 engaging the sealing ring 64 and closing off the lateral openings 50 the generator is ready to be primed or "set" for firing or producing a pulse. This is achieved by pumping a gas of relatively high sound speed, preferably helium, through the gas supply line 86 into the control chamber 34 and into the charging chamber 4. As the gas passes through the holes 68 the piston valve 30 is forced down to seal against the sealing ring 32 to close the outlet 26. The relatively high resistance-to-flow through-hole 40 in the wall 38 of the piston valve cylinder 20 allows gas to pass into the charging chamber.

The control chamber and the charging chamber may be pressurised to a pressure of, for example, 50 to 120 bar.

If the lower part of the lower second chamber 8 has merely been lowered and submerged in water then the second chamber, which is closed off at the upper end by the engagement of the piston valve 60 with the sealing ring 32 and at the lower end merely by the water, contains air (which is a gas of relatively low sound speed) at a pressure of approximately 1 bar.

The generator is now primed. In order to 'fire' the primed generator, the solenoid valve is momentarily energised i.e. for about 25 ms, from a remote location. This causes the plunger valve 60 to slide rapidly up the valve stem 42 and move away from the position whereat it closes the lateral openings 50 so as to uncover these openings and allow gas in the control chamber 34 to be rapidly released or vented to atmosphere via holes 68, the lower portion of the annular channel 58, the lateral holes 50, the axial passage 44, the chamber 14, the outlet 70 and the silencer 74. While this gas is being rapidly released to atmosphere, the relatively high resistance-to-flow hole 40 prevents the gas pressure in the charging chamber 4 falling appreciably over the same time period. This results in an imbalance in pressure between control chamber 34 and the charging chamber 4. The considerable drop in pressure in the control chamber, i.e. above the piston valve 30, enables the pressurised gas in the charging chamber 4 which is acting on the peripheral edge of the lower face 30a to move the piston valve upwards and cause it to become rapidly or abruptly disengaged from the sealing ring 32 thereby allowing gas from the relatively high pressure chamber 4 to flow rapidly through the outlet 26 into the lower chamber 8. A shock wave develops and propagates into the air in chamber 8 and exits from the latter via the submerged outlet 8a. The rapidity of the release of the small amount of gas to atmosphere via the silencer 74 is important in order to obtain the desired abrupt release of gas through the outlet 26. In the present embodiment it is believed that the rapid release of the small amount of gas is facilitated or enhanced by the passage 44 and 14 in the valve stem, the buffer chamber 14 in the plug and the silencer 74 being generally aligned and only a small deviation (or baffling effect?) of the gas from the control chamber 34 being necessary to direct the gas into the passage 44, i.e. via the lateral openings 50.

Applicants experiments using a generator as referred to above have thus shown that the desired rapid disengagement of the piston valve 30 from the outlet 26 using a compact solenoid arrangement and that the desired high rate of release of only a small amount of gas from immediately above the piston valve 30 (i.e. from the control chamber 34) can be achieved.

After the generator has 'fired' the gas is again pumped into the control chamber and charging chamber as before, and the non-energised solenoid valve condition means that the plunger valve 60 returns to its closed position to close the lateral opening 50 and the piston valve 30 is able to re-seat or re-engage with the sealing ring 32 and close the outlet 26. By repeating the sequence of operations described above the generator can automatically be repeatedly primed or 'set' for firing.

In a modified embodiment, the permanently open outlet end 8a of the second chamber 8 is replaced by an outlet means 114 comprising a valve 116 such as a gate valve which is operable to open from a closed position whereat it closes the outlet from the second chamber. The valve 116 would be controlled remotely (not shown) in timed relationship with the actuation of the solenoid valve arrangement and/or the opening of the outlet 26 in a manner which would be apparent to a person skilled in the art.

The valve 116 may form part of a fitting 118 adapted to be a releasable fit on the second chamber. The second chamber may be adapted (not shown) so as to be pressurisable. The second chamber could then contain, for example, air at significantly more than 1 bar. With this modification, there is not the restriction of the second chamber having to contain gas or air only at about 1 atmosphere.

Whilst a particular embodiment and modification of the embodiment have been described above, it will be understood that various alterations may be made without departing from the scope of the invention. For example, the control chamber 34 need not be in communication with the charging chamber 4. In the absence of communication between these two chambers, it will be appreciated that the charging chamber must have a separate gas inlet via which pressurised gas can be supplied to the charging chamber. It will also be appreciated that the generator may be used in a medium or fluid other than water. For example, the generator may be fired into drilling mud or just into air.

What is claimed is:

1. A seismic pulse generator comprising a body having an internal gas-pressurisable charging chamber, an outlet, and a gas-operated piston valve which is slidably movable within an associated guide to a position to close the outlet when the charging chamber is pressurised with gas to attain a primed ready to fire state for the generator, the piston moving away from the closed position to permit an abrupt release of pressurised gas from the charging chamber through the outlet upon firing of the generator by release of a small portion of gas from a gas pressurised control chamber to atmosphere by means of a solenoid valve assembly mounted on the body, the solenoid valve assembly comprising an annular plunger valve slidably mounted on a valve stem so as to be movable within an annular channel defined between the valve stem and an annular wall, the valve stem having a generally longitudinal gas exhaust passage extending therethrough and terminating at a first opening at the end of the stem remote from the piston, via which first opening the passage communicates with atmosphere, and at least one second lateral opening in the side or peripheral wall of the stem for communicating with the interior of the control chamber, wherein the valve plunger is normally biased to a position on the valve stem whereat the valve plunger closes off the at least one second opening and wherein on actuation of the solenoid valve the plunger slides on the valve stem away from the closed position to allow the at least one second opening to be in communication with the control chamber, whereby the release of the small portion of pressurised gas from the control chamber to atmosphere can occur.

2. A generator as claimed in claim 1, in which the passage, via the first opening, opens into a buffer chamber of relatively large volume and having an outlet which vents to atmosphere.

3. A generator as claimed in claim 2, in which the buffer chamber is in part defined by a plug fitting on the body of the generator.

4. A generator as claimed in claim 3, in which the plug is adapted to be a removable fit on the body.

5. A generator as claimed in claim 2, in which the longitudinal part of the passage in the valve stem and the buffer chamber are substantially in alignment.

6. A generator as claimed claim 2, in which the buffer chamber serves as a conduit for a portion of an electrical power supply line for the solenoid valve and/or for a portion of a pressurising gas inlet line for the control chamber.

7. A generator as claimed in claim 1, in which a silencer is mounted on the body, via which silencer the passage communicates with atmosphere and through which passes gas released via the passage from the control chamber.

8. A generator as claimed in claim 1, in which the solenoid valve assembly includes a gas inlet for communicating with the annular channel in which the valve plunger moves, the valve plunger at least in part defining passages to allow communication between the gas inlet and the control chamber.

9. A generator as claimed in claim 8, in which the annular valve plunger comprises in its outer peripheral surface channels or grooves which extend generally longitudinally of the plunger and define with the annular wall the passages allowing communication between the gas inlet and the control chamber.

10. A generator as claimed in claim 1, in which the piston guide is in the form of a cylinder located in the pressurisable chamber and aligned with the outlet associated with the piston valve, an end of the cylinder remote from the outlet accommodating the solenoid valve assembly, the control chamber being defined by the cylinder and the opposing solenoid valve assembly and piston valve when the latter is in its closed position closing off the outlet.

11. A generator as claimed in claim 1, in which the control chamber communicates with the charging chamber via a bleed hole or resistance-to-gas flow hole.

12. A generator as claimed in claim 10, in which the plug is adapted to be a removable fit on the body and in which the bleed hole or resistance-to-gas flow is provided through the wall of the cylinder.

13. A generator as claimed in claim 1, in which the solenoid valve assembly comprises one or more body parts defining at least one passage which provides communication with the passage in the valve stem when the solenoid valve is actuated and the at least one lateral opening in the valve stem is uncovered as the valve plunger moves from its closed position.

14. A generator as claimed in claim 1, in which the piston valve is substantially of simple cylindrical form.

15. A generator as claimed in claim 1, in which the piston valve is made of lightweight material, such as a plastics material.

16. A generator as claimed in claim 1, in which the pressurisable charging chamber adjoins a second chamber with the outlet which is closable by the piston valve opening into the second chamber such that when the generator is "fired" the piston valve moves away from the closed position to uncover the outlet to cause communication between the adjoining chambers and generation of a shock wave in the second chamber in response to the abrupt release of gas from the pressurised charging chamber, which second chamber has means to permit a pulse of energy to be transmitted from the second chamber in response to the shock wave generated in the second chamber.

17. A generator as claimed in claim 16, in which the means to permit a pulse of energy to be transmitted comprises outlet means to permit the release of gas pressure and shock wave from the second chamber.

18. A generator as claimed in claim 17, in which the outlet means is a permanently open outlet from the second chamber.

19. A generator as claimed in claim 17, in which the outlet means comprises a valve which is operable to open from a closed position whereat it closes an outlet from the second chamber.

20. A generator as claimed in claim 19, in which the outlet means valve forms part of a fitting adapted to fit releasably onto the second chamber.

21. A seismic pulse generator comprising a body having an internal gas-pressurisable charging chamber adjoining a second chamber with an outlet means, a gas operated piston which when the charging chamber is pressurised is movable away from a position whereat it closes an opening to cause communication between the chambers, abrupt release of gas from the pressurised charging chamber through the opening, and generation of a shock wave in the second chamber, the gas operated piston being slidably movable within an associated cylinder located in the first chamber, a gas pressurisable control chamber being defined by the end of the piston remote from the opening when the piston is in the opening closed position, a section of the cylinder and a solenoid valve assembly mounted on the body at or adjacent the end of the cylinder remote from the opening, wherein when the control chamber is pressurised and the valve assembly is in a non-actuated state or condition a gas exhaust passage for connecting the control chamber to atmosphere is closed, and wherein on actuation the solenoid valve assembly operates to effect communication between the control chamber and atmosphere via the gas exhaust passage to allow the release of gas from the control chamber to atmosphere and the piston to move away from the opening-closed position and permit the abrupt release of gas from the pressurised charging chamber.

22. A seismic pulse generator comprising a body having an internal gas-pressurisable charging chamber, an outlet, and a gas-operated piston valve which is slidably movable within an associated guide to a position to close the outlet when the charging chamber is pressurised with gas to attain a primed ready to first state for the generator, said generator further including a gas pressurised control chamber for releasing to atmosphere a small portion of gas to cause the piston to move away from the closed position and to thereby permit an abrupt release of pressurised gas from the charging chamber through the outlet, and a buffer chamber in communication with said control chamber such that the small portion of released gas passes through the buffer chamber before passing to atmosphere.

23. In combination, a seismic pulse generator and a silencer connected to said seismic pulse generator, said generator comprising a body having an internal gas-pressurisable charging chamber, an outlet, and a gas-operated piston valve which is slidably movable within an associated guide to a position to close the outlet when the charging chamber is pressurised with gas to attain a primed ready to first state for the generator, the piston said generator further comprising a gas pressurised control chamber for releasing to atmosphere a small portion of gas to cause movement of away from the closed position to permit an abrupt release of pressurised gas from the charging chamber through the outlet, the small portion of released gas passing to atmosphere through the silencer connected to the generator.

* * * * *